United States Patent
Won

(10) Patent No.: US 6,741,298 B1
(45) Date of Patent: May 25, 2004

(54) MOUNTING BRACKET USED FOR ASSEMBLING LIQUID CRYSTAL DISPLAY MODULE WITH MONITOR CASE

(75) Inventor: Se Chang Won, Kyongbuk (KR)

(73) Assignee: LG. Philips LCD Co., Ltd., Seoul (KR)

( * ) Notice: Subject to any disclaimer, the term of this patent is extended or adjusted under 35 U.S.C. 154(b) by 0 days.

(21) Appl. No.: 09/481,091

(22) Filed: Jan. 11, 2000

(30) Foreign Application Priority Data

Jan. 13, 1999 (KR) ......................................... 1999-01112

(51) Int. Cl.[7] ............................................. G02F 1/1333
(52) U.S. Cl. ......................................... 349/58; 361/681
(58) Field of Search .................. 349/58; 361/681–690; 312/7.2, 223.1, 223.2, 271–276; 248/917–924

(56) References Cited

U.S. PATENT DOCUMENTS

| | | | | |
|---|---|---|---|---|
| 5,835,139 A | * | 11/1998 | Yun et al. ...................... | 349/58 |
| 5,946,061 A | * | 8/1999 | Kurihara et al. ............... | 349/58 |
| 6,046,785 A | * | 4/2000 | Won .............................. | 349/58 |
| 6,064,565 A | * | 5/2000 | Ishihara et al. ............. | 248/917 |
| 6,175,396 B1 | * | 1/2001 | Kim et al. ..................... | 349/58 |
| 6,330,148 B1 | * | 12/2001 | Won et al. ................... | 361/681 |
| 6,411,501 B1 | * | 6/2002 | Cho et al. ..................... | 361/681 |

* cited by examiner

*Primary Examiner*—Tarifur R. Chaudhury
*Assistant Examiner*—P. R. Akkapeddi
(74) *Attorney, Agent, or Firm*—Birch, Stewart, Kolasch & Birch, LLP

(57) ABSTRACT

An LCD monitor for a computer includes an LCD module, a front frame and a rear main frame, where the front frame has a vertical flange portion corresponding to sides of the LCD module. A bracket is provided and has a vertical coupling portion for coupling to the flange of the front frame. A monitor case is provided for encasing the LCD module. A horizontal coupling portion is provided for coupling to the rear main frame such that the front frame, rear main frame and the monitor case are all coupled together using a novel side-mounting technique.

23 Claims, 4 Drawing Sheets

MOUNTING BRACKET USED FOR ASSEMBLING LIQUID CRYSTAL DISPLAY MODULE WITH MONITOR CASE

This application claims the benefit of Korean Patent Application No. 1999-01112, filed on Jan. 13, 1999, which is hereby incorporated by reference.

BACKGROUND OF THE INVENTION

1. Field of the Invention

The present invention relates to a liquid crystal display (LCD) module. More specifically, the present invention relates to a mounting bracket that is used to mount a LCD module in a monitor case of a computer.

2. Description of the Related Art

Generally, a portable computer uses an LCD device as a monitor since the LCD is compact. In recent years, the LCD also has been used for desktop computers since the LCD device also has the advantages of reducing both eye fatigue and electromagnetic radiation FIG. 1 is an exploded perspective view of a conventional LCD module. Referring to FIG. 1, an LCD module 110 includes a back light unit 140 and a LCD panel 120. The back light unit 140 and the LCD panel 120 are attached to each other by a rectangular rear main frame 150 and a front frame 160. The rear main frame 150 is usually made of a plastic material. The back light unit 140 includes a reflective plate 146, a waveguide plate 145, a first diffuser/protecting sheet 144, a first prism sheet 143, a second prism sheet 142, and a second diffuser/protecting sheet 141, each stacked in the above-described order such that the reflective plate 146 constitutes the back of the back light unit 140. The rectangular rear main frame 150 is coupled to the front frame 160 with the liquid crystal panel 120 and the back light unit 140 interposed therebetween. The front frame 160 has vertical and horizontal flange portions 161 and 162, respectively.

The above-described LCD module 110 is designed to be mounted on the monitor case of a portable computer. The rear main frame 150 has screw holes 151 provided at one of its sides, and the front frame 160 is provided at its vertical flange portion 161 with screw holes 163, which correspond to positions of the screw holes 151. The screw holes 151 and 163 will be described in more detail hereinbelow.

The conventional LCD module 110 is mounted on the monitor case of a computer using a side mounting technique to provide a larger display area. The above-described structure and a method for mounting the LCD module on the monitor case of a portable computer is disclosed in U.S. Pat. No. 5,835,139.

Referring to FIG. 2, the conventional monitor includes a front case 121 and a rear case 124. The rear case 124 is provided with screw holes 124a that correspond to locations of the screw holes 151 and 163 of the respective rear main frame 150 and the front frame 160 of FIG. 1 so as to mount the LCD module 110 onto the rear case 124 by screwing the screws 130 into the holes 124a, 151 and 163.

But, as LCD technology advances, the LCD module becomes thinner. This makes it very difficult to assemble the LCD module with the side mounting technique described above. More specifically, when the LCD module is mounted on the mainframe through the sides thereof, the area for screwing the screws through the sides becomes less since the thickness of the LCD module is reduced.

A conventional solution to this problem is to use a screw that has a diameter of less than about 2 mm. However, one problem with this solution is that the durability of the LCD module is weakened because of the small diameter of the screw. Also, the assembly process with such a screw is difficult. Further, it is likely that the screw will not be able to maintain its fastening position and will become loosened or will be removed from the various holes thereby causing the LCD module to become detached from the computer case.

SUMMARY OF THE INVENTION

To overcome the problems described above, preferred embodiments of the present invention provide an improved structure for mounting the LCD module to the monitor case using a side mounting technique and with screws that have sufficient diameter to maintain durability and the avoid the problems of the prior art.

A preferred embodiment of the present invention provides a liquid crystal display module for use in a computer having a first frame and a second frame, wherein the first frame further includes horizontal and vertical flange portions such that the horizontal flange portion is substantially perpendicular to the vertical flange portion and the horizontal flange portion is substantially parallel to a surface of the front frame and in contact with a portion of the front frame, a rear monitor case for encasing the liquid display module such that rear monitor case covers the second frame, and a bracket having a vertical coupling portion and a horizontal coupling portion, wherein a first end of the vertical coupling portion is substantially perpendicular to the horizontal coupling portion, wherein the vertical coupling portion of the bracket is disposed on an inner surface of the vertical flange of the first frame and the horizontal coupling portion of the bracket is disposed on an outer surface of the second frame, wherein the vertical coupling portion couples the first frame and the rear monitor case, and wherein the horizontal coupling portion couples the second frame to the first frame and the rear monitor case.

In another preferred embodiment of the present invention, there is provided a mounting bracket for assembling a LCD module having rear and front frames and a LCD panel mounted between the rear and front frames, wherein the mounting bracket includes a vertical portion, and a first horizontal portion, wherein the first horizontal portion is substantially perpendicular to a first end of the vertical portion.

Other features, elements and advantages of the present invention will be described in detail below with reference to preferred embodiments of the present invention and the attached drawings.

BRIEF DESCRIPTION OF THE ATTACHED DRAWINGS

The present invention will become more fully understood from the detailed description given hereinbelow and the accompanying drawings which are given by way of illustration only, and thus do not limit the present invention and wherein.

DETAILED DESCRIPTION OF PREFERRED EMBODIMENTS

Preferred embodiments of the present invention will now be described in detail with reference to the attached drawings. Note that the same reference numbers are used for the same components in FIGS. 1–6.

Figure 1:
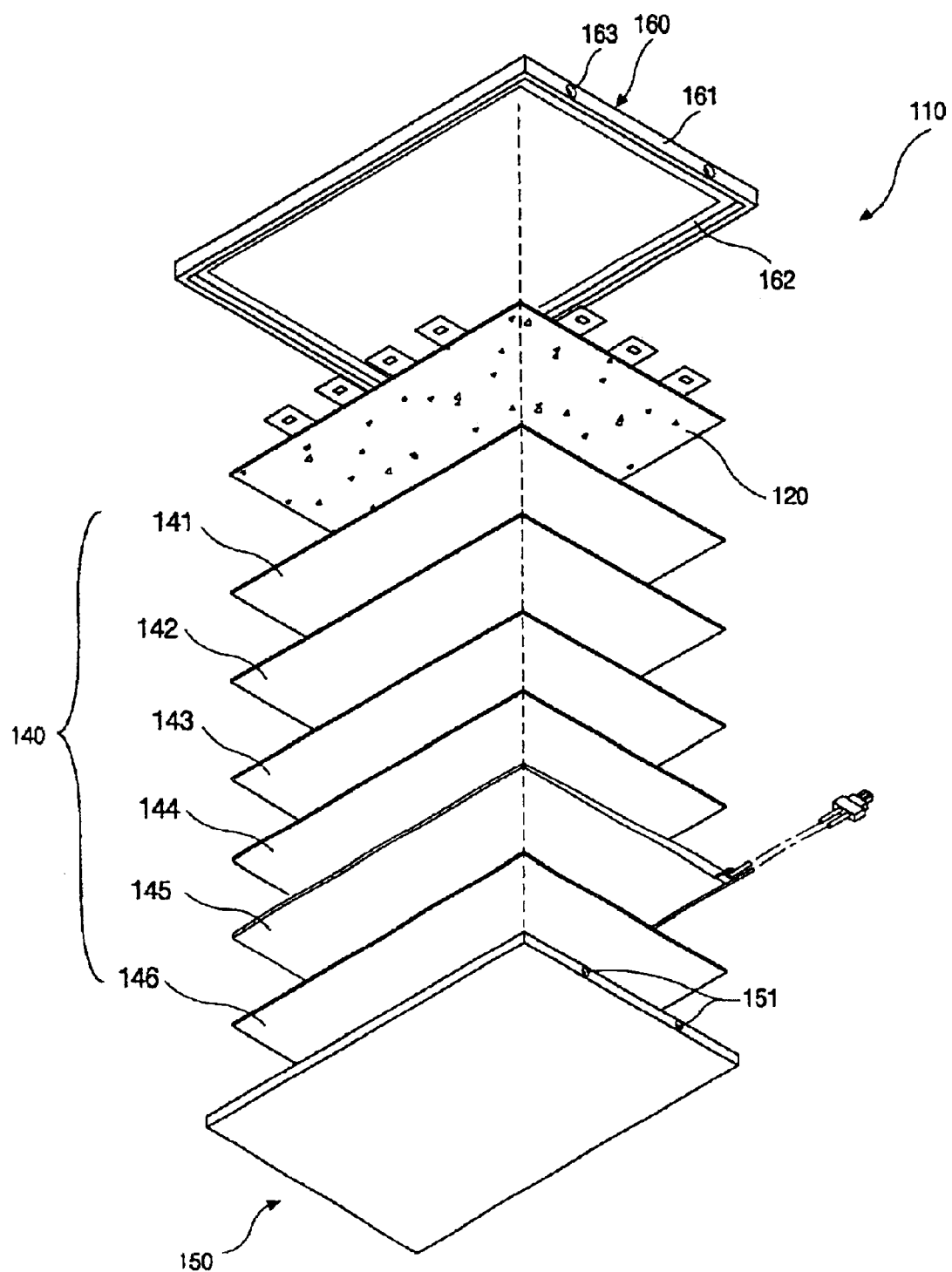
FIG. 1 is an exploded perspective view of a conventional LCD module.
Figure 2:
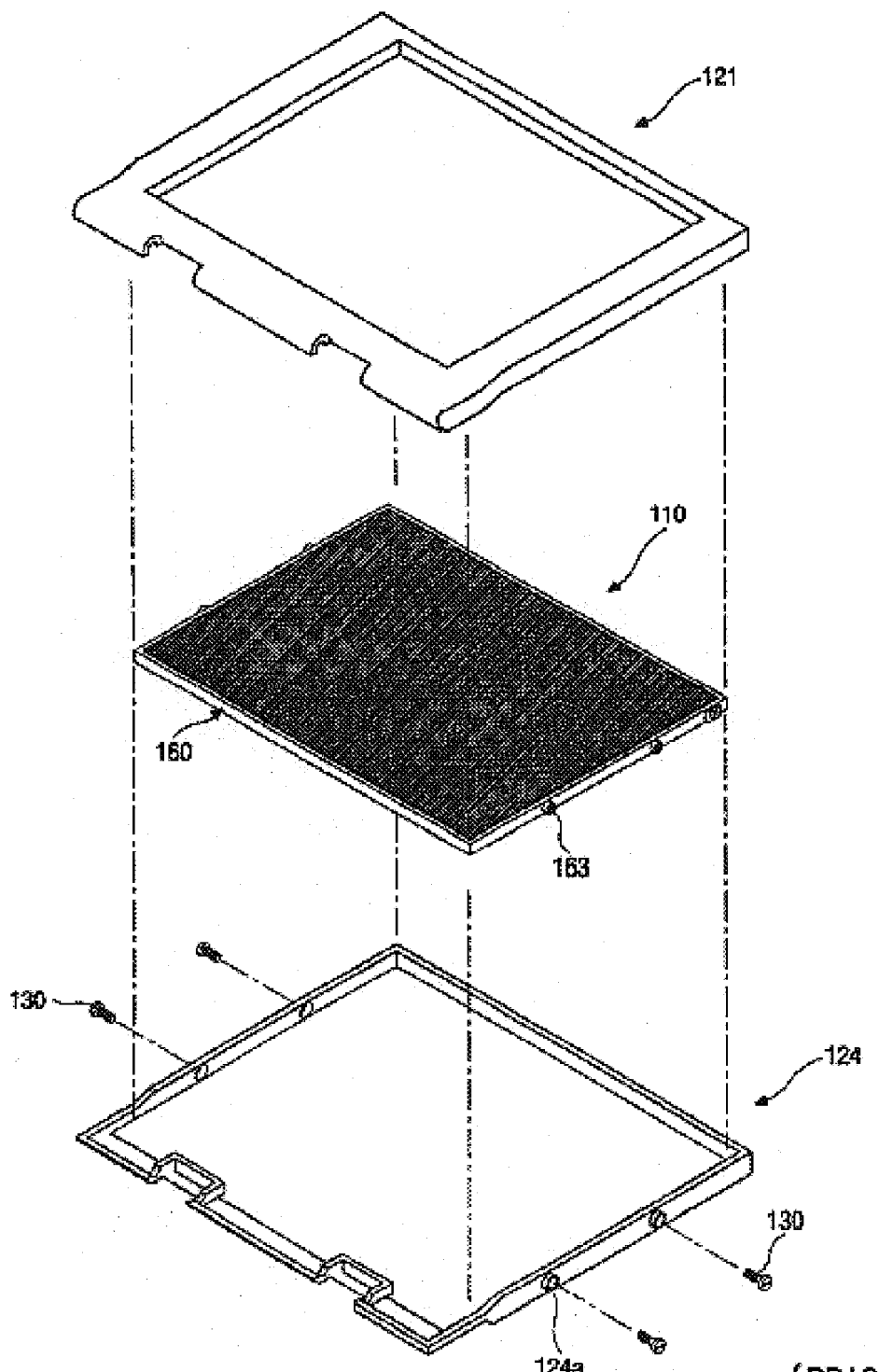
FIG. 2 is an exploded perspective view of a computer monitor including the LCD module of FIG. 1.
Figure 3:
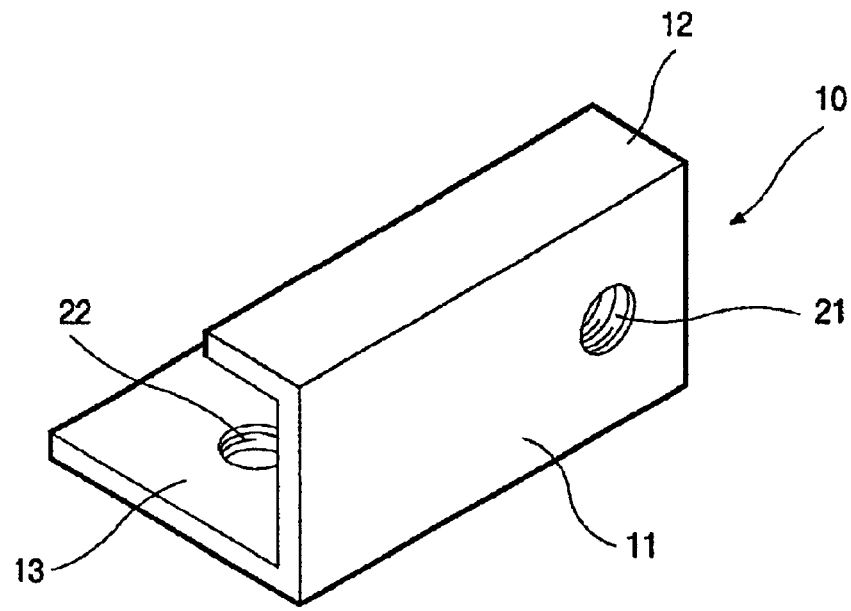
FIG. 3 is a perspective view of a mounting bracket for an LCD module according to a preferred embodiment of the present invention.

FIG. 3 is a perspective view of bracket according to a preferred embodiment of the present invention. Referring to FIG. 3, the bracket 10 includes a vertical portion 11, a lower horizontal portion 13, and an upper horizontal portion 12. The lower and upper horizontal portions 13 and 12 are substantially parallel to each other and substantially perpendicular to the vertical portion 11. The height of the vertical portion 11 is preferably similar to that of the vertical flange portion of the front frame 161 of FIG. 1 so that the vertical portion 11 contacts the bottom surface of the horizontal flange portion 162 of FIG. 1. The vertical portion 11 and the lower horizontal portion 13 are provided with first and second screw holes 21 and 22, respectively. The first and second screw holes 21 and 22 are defined on opposing sides so as to be offset from each other with respect to an imaginary longitudinal line.

Figure 4:
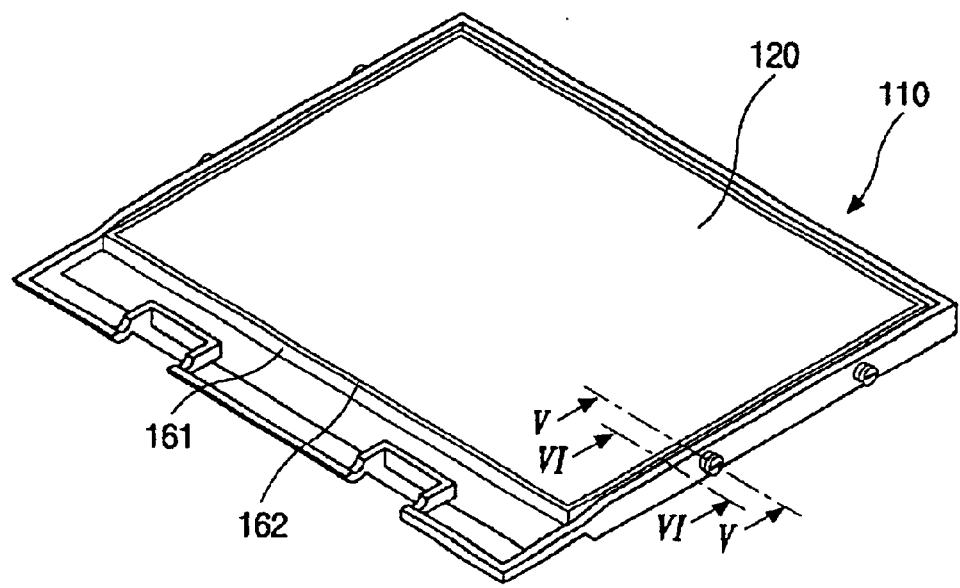
FIG. 4 is a perspective view of a rear monitor case in which a display module is mounted by a mounting bracket of FIG. 3.
Figure 5:
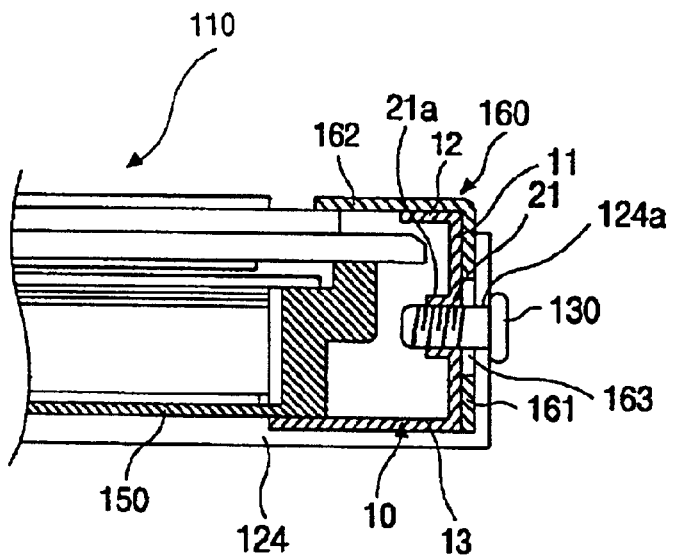
FIG. 5 is a cross-section view taken along the line V—V of FIG. 4.
Figure 6:
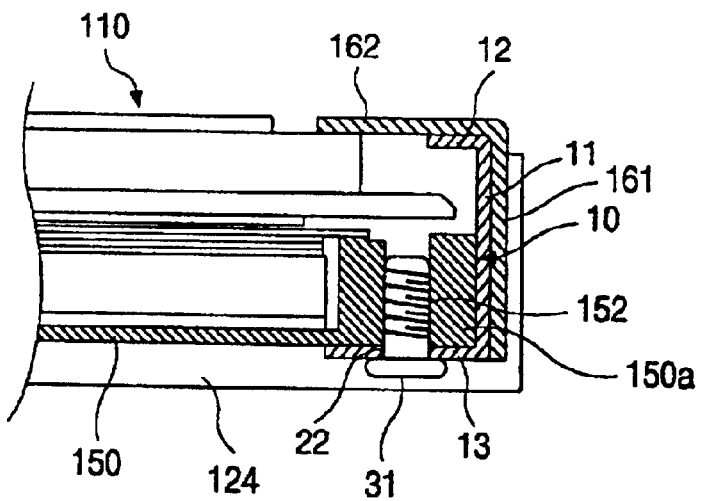
FIG. 6 is a cross-section view taken along the line VI—VI of FIG. 4.

FIG. 4 is a perspective view of a rear monitor case with which the LCD module is mounted by the bracket of FIG. 3. Note that in FIG. 4, the bracket 10 is not shown. Referring to FIGS. 5 and 6, the bracket 10 is shown in cross-section along the lines V—V and VI—VI of FIG. 4, respectively.

Referring first to FIG. 5, the bracket 10 is disposed between the front frame 160 and the rear main frame 150. The vertical portion 11 is disposed between an inner surface of the vertical flange portion 161 of the front frame 160 and an outer side of the rear main frame 150. The lower horizontal portion 13 is arranged to contact a bottom of the rear main frame 150, and the upper horizontal portion 12 is arranged to contact a bottom surface of the horizontal flange portion 162 of the front frame 160.

The vertical flange portion 161 of the front frame 160 is provided with a screw hole 163 that corresponds to a location of the first screw hole 21 at the vertical portion 11 of the bracket 10. The rear monitor case 124 is also provided with a screw hole 124a that corresponds to a location of the screw holes 163 and 21 of the front frame 160 and the vertical portion 11 of the bracket 10, respectively. A screw 130 is screwed into the screw hole 163 of the front frame 160, the first screw hole 21 of the bracket 10, and the screw hole 124a of the rear monitor case 124, thus coupling the front frame 160 and the rear monitor case 124 to each other.

In addition, a portion of the vertical portion 11 of the bracket 10 that defines the first screw hole 21 extends inward to define a hollow, substantially cylindrical projection 21a which supports screw-coupling via the screw 130. The substantially cylindrical projection 21a allows the thickness of the bracket 10 to be minimized without lessening the tightening force of the screw 130.

Referring to FIG. 6, the rear main frame 150 is also coupled to the rear monitor case 124 by the bracket 10. More specifically, the bracket 10 is disposed in such a manner that the lower horizontal portion 13 contacts the bottom surface of the rear main frame 150. The rear main frame 150 extends at the corresponding position to the screw hole 22 that is defined on the lower horizontal portion 13 to constitute a hole 150a to define a screw hole 152 for screw-coupling with the second screw hole 22 that is provided in the lower horizontal portion 13. Accordingly, by tightening a screw 31 into the second screw hole 22 of the bracket 10 and the screw hole 152 of the rear main frame.,150, the rear main frame 150 is coupled to the bracket 10.

As described above, the bracket 10 couples the front frame with the rear monitor case while also mounting the rear main frame to the LCD module so that the durability of the LCD module is not weakened, and may even be strengthened.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A liquid crystal display for a computer comprising:

a liquid crystal display module having a first frame and a second frame, wherein the first frame further includes horizontal and vertical flange portions such that the horizontal flange portion is substantially perpendicular to the vertical flange portion and the horizontal flange portion is parallel to a surface of the second frame and in contact with a portion of the second frame;

a rear monitor case for encasing the liquid crystal display module such that rear monitor case covers the second frame; and a bracket having a vertical coupling portion and a horizontal coupling portion, wherein a first end of the vertical coupling portion is perpendicular to the horizontal coupling portion, wherein the vertical coupling portion of the bracket is disposed at an inner surface of the vertical flange of the first frame and the horizontal coupling portion of the bracket is disposed at a surface of the second frame, wherein the vertical coupling portion couples the first frame and the rear monitor case, and wherein the horizontal coupling portion couples the second frame to the first frame and the rear monitor case, and the bracket being internal to the first and second frames.

2. The display of claim 1, wherein the bracket further comprises a first screw hole located on the vertical portion of the bracket, wherein a second screw hole is located on the vertical flange of the first frame, wherein a third screw hole is located on a side surface of the rear monitor case, and wherein the second screw hole of the vertical flange of the first frame and the third screw hole of the rear monitor case are aligned with the first screw hole on the vertical portion of the bracket and a coupling member extends through the first, second and third screw holes.

3. The display of claim 1, wherein the bracket further comprises a first screw hole located in the horizontal portion of the bracket, wherein a second screw hole is located in the second frame, and wherein the second screw hole of the second frame is aligned with the first screw hole of the horizontal portion of the bracket of the bracket and a coupling member extends through the first and second screw, holes.

4. The display of claim 1, wherein the bracket further comprises a horizontal portion that is substantially perpendicular to a second end of the vertical portion of the bracket for supporting the first frame by contacting the horizontal flange of the first frame.

5. The display of claim 2, wherein the vertical portion of the bracket that defines the first screw hole has a cylindrical projection that is substantially perpendicular to the vertical portion of the bracket and is constructed to increase a tightening force of a screw disposed in the first screw hole.

6. A mounting bracket for assembling an LCD module having rear and front frames and a LCD panel mounted between the rear and front frames, wherein the mounting bracket comprises:
   a vertical portion;
   a first horizontal portion, wherein the first horizontal portion is substantially perpendicular to a first end of the vertical portion;
   a second horizontal portion for supporting the front frame, the second horizontal portion being substantially perpendicular to a second end of the vertical portion, the bracket being internal to the front and rear frames; and
   said vertical portion and said second horizontal portion being disposed between said LCD panel and said front frame, said first horizontal portion being disposed outside said rear frame, and said rear frame being disposed between said LCD panel and said first horizontal portion.

7. The mounting bracket of claim 6, wherein the vertical portion is constructed to be coupled to the front frame, and the first horizontal portion is constructed to be coupled to the rear frame.

8. The mounting bracket of claim 6, wherein the vertical portion is constructed to be coupled to a monitor case.

9. The mounting bracket of claim 6, wherein the vertical portion of the bracket is provided with a first screw hole and the front frame is provided with a second screw hole for aligning with the first screw hole of the vertical portion of the bracket and arranged such that a coupling member is received in the first and second screw holes.

10. The mounting bracket of claim 9, wherein the first horizontal portion is provided with a third screw hole and the rear frame is provided with a fourth screw hole for aligning with the third screw hole and arranged such that a coupling member is received in the third and fourth screw holes.

11. An LCD monitor for a computer, comprising:
   an LCD module including:
      (a) an LCD panel;
      (b) a back light unit providing light to the LCD panel;
      (c) a rear main frame for supporting the LCD panel and the back light unit; and
      (d) a front frame coupled to the rear main frame with the LCD panel and the back light unit disposed therebetween, the front frame having a flange portion corresponding to sides of the LCD panel and the back light unit;
   a bracket having a first coupling portion for coupling to the flange of the front frame and a second coupling portion for coupling to the rear main frame, the bracket being internal to the front frame and the rear main frame; and
   a monitor case for encasing the LCD module, the monitor case being coupled to the first coupling portion of the bracket.

12. An LCD monitor of claim 11, wherein the bracket comprises a vertical portion and a lower horizontal portion that is substantially perpendicular to the vertical portion, the vertical portion being provided with a first screw hole defining the first coupling portion and the lower horizontal portion being provided with a second screw hole defining the second coupling portion, and wherein the flange portion of the front frame is provided with a screw hole corresponding to a position of the first screw hole of the bracket and the rear-main frame is provided with a screw hole corresponding to a position of the second screw hole of the bracket.

13. An LCD monitor of claim 11, wherein the bracket further comprises an upper horizontal portion that is substantially perpendicular to the vertical portion and is arranged to support a bottom of the front frame.

14. An LCD monitor of claim 12, wherein a portion of the vertical portion of the bracket, which includes the first screw hole, extends toward the rear main frame to define a hollow cylindrical projection to which a coupling member is attached.

15. A liquid crystal display for a computer comprising:
   a liquid crystal display module having an LCD panel, a front frame and a rear frame, wherein the front frame and the rear frame are attached to each other with the LCD panel disposed therebetween;
   a bracket having a first coupling portion including a first coupling unit and a second coupling portion including a second coupling unit, the bracket being internal to the front and rear frames;
   a monitor case for encasing the liquid display module; wherein
      the monitor case is coupled to the first coupling portion of the bracket through the first coupling unit, the front frame of the liquid crystal module being coupled to the first coupling portion through the first coupling unit, and the liquid crystal display module is coupled to the bracket via the second coupling unit such that rear monitor case covers the second frame.

16. The liquid crystal display according to claim 15, wherein the first coupling portion comprises a vertical coupling member and the second coupling member comprises a horizontal coupling member.

17. The liquid crystal display according to claim 15, wherein the bracket surrounds a portion of the rear frame and the front frame of the liquid crystal display module.

18. The liquid crystal display according to claim 15, wherein first coupling unit and the second coupling unit each includes a coupling member and a through hole for receiving the coupling member.

19. The liquid crystal display according to claim 18, wherein the coupling member comprises a screw and the through hole comprises a threaded screw hole.

20. The liquid crystal display according to claim 15, wherein the bracket further comprises a vertical portion and a horizontal portion, and a first screw hole in the vertical portion of the bracket, wherein a second screw hole is located on a vertical flange of the front frame, wherein a third screw hole is located on a side surface of the monitor case, and wherein the second screw hole of the vertical flange of the front frame and the third screw hole of the monitor case are aligned with the first screw hole on the vertical portion of the bracket and a coupling member extends through the first, second and third screw holes.

21. The liquid crystal display according to claim 15, wherein the bracket further comprises a vertical portion and a horizontal portion, and a first screw hole is located on the horizontal portion of the bracket, wherein a second screw hole is located on the rear frame of the liquid crystal module, and wherein the second screw hole of the second frame is aligned with the first screw hole of the horizontal portion of the bracket and a coupling member extends through the first and second screw holes.

22. The liquid crystal display according to claim 15, wherein the bracket further comprises a vertical portion and a horizontal portion that is substantially perpendicular to an end of the vertical portion of the bracket for supporting the front frame.

23. The liquid crystal display according to claim 15, wherein the bracket further comprises a vertical portion that includes a first screw hole and includes a cylindrical projection that is substantially perpendicular to the vertical portion of the bracket and is constructed to increase a tightening force of a screw disposed in the first screw hole.

* * * * *